(12) United States Patent
Kral et al.

(10) Patent No.: US 11,738,616 B2
(45) Date of Patent: Aug. 29, 2023

(54) VEHICLE HANDLING

(71) Applicant: JAGUAR LAND ROVER LIMITED, Coventry (GB)

(72) Inventors: Konrad Kral, Warwickshire (GB); William Burdock, Warwickshire (GB); Philip Guest, Warwickshire (GB); Robert Patching, Warwickshire (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 0 days.

(21) Appl. No.: 16/064,630

(22) PCT Filed: Dec. 13, 2016

(86) PCT No.: PCT/EP2016/080843
§ 371 (c)(1),
(2) Date: Jun. 21, 2018

(87) PCT Pub. No.: WO2017/108507
PCT Pub. Date: Jun. 29, 2017

(65) Prior Publication Data
US 2019/0001777 A1 Jan. 3, 2019

(30) Foreign Application Priority Data
Dec. 23, 2015 (GB) .................................... 1522724

(51) Int. Cl.
*B60G 17/016* (2006.01)
*B60G 17/019* (2006.01)

(52) U.S. Cl.
CPC ..... *B60G 17/016* (2013.01); *B60G 17/01908* (2013.01); *B60G 17/01933* (2013.01);
(Continued)

(58) Field of Classification Search
CPC ............ B60G 17/016; B60G 17/01908; B60G 17/01933; B60G 2400/0521;
(Continued)

(56) References Cited

U.S. PATENT DOCUMENTS

| 5,083,275 A | | 1/1992 | Kawagoe et al. |
| 5,430,647 A | * | 7/1995 | Raad .................... B60G 17/016 |
| | | | 180/41 |

(Continued)

FOREIGN PATENT DOCUMENTS

| GB | 2511827 A | 9/2014 |
| WO | 94/00307 A2 | 1/1994 |
| WO | WO-9400307 A2 * | 1/1994 ......... B60G 17/0523 |

OTHER PUBLICATIONS

International Search Report and Written Opinion, PCT/EP2016/080843, dated Mar. 30, 2017, 12 pages.
(Continued)

*Primary Examiner* — James M McPherson
*Assistant Examiner* — Bakari Underwood
(74) *Attorney, Agent, or Firm* — McCoy Russell LLP (57) ABSTRACT

The invention resides in a system and method for determining the manner in which a vehicle is driven. The system comprises a processor comprising an input configured to receive dynamic ride data from at least one on-board vehicle dynamic ride sensor, wherein the processor is configured (i) to calculate an output signal which is indicative of whether the dynamic ride data exceeds at least one dynamic ride data threshold value for a predetermined period of time; and (ii) to compare the output signal with at least one output threshold to determine the manner in which the vehicle is driven. The processor comprises an output configured to
(Continued)

send a control signal to one or more vehicle components, wherein the control signal is indicative of the manner in which the vehicle is driven.

14 Claims, 9 Drawing Sheets

(52) U.S. Cl.
CPC ............... *B60G 2400/0521* (2013.01); *B60G 2400/0522* (2013.01); *B60G 2400/0523* (2013.01); *B60G 2400/102* (2013.01); *B60G 2400/104* (2013.01); *B60G 2400/106* (2013.01); *B60G 2400/204* (2013.01); *B60G 2400/252* (2013.01); *B60G 2400/30* (2013.01); *B60G 2400/33* (2013.01); *B60G 2400/41* (2013.01); *B60G 2400/96* (2013.01); *B60G 2500/30* (2013.01)

(58) Field of Classification Search
CPC .... B60G 2400/0522; B60G 2400/0523; B60G 2400/102; B60G 2400/104; B60G 2400/106; B60G 2400/204; B60G 2400/252; B60G 2400/41; B60G 2400/30
See application file for complete search history.

(56) References Cited

U.S. PATENT DOCUMENTS

| | | | | |
|---|---|---|---|---|
| 5,821,860 | A * | 10/1998 | Yokoyama | G08B 21/06 340/576 |
| 2003/0182042 | A1* | 9/2003 | Watson | B60R 21/01336 701/45 |
| 2007/0282498 | A1* | 12/2007 | Holbrook | B60G 17/0162 701/37 |
| 2008/0243327 | A1* | 10/2008 | Bujak | B60W 30/12 701/33.7 |
| 2012/0109461 | A1* | 5/2012 | Nitta | B60W 50/045 701/41 |
| 2013/0110389 | A1* | 5/2013 | Solbrack | B60G 17/01908 701/124 |
| 2016/0023530 | A1* | 1/2016 | Guest | B60G 17/0165 701/38 |
| 2017/0061710 | A1* | 3/2017 | Saeger | B60W 40/06 |

OTHER PUBLICATIONS

Search and Examination Report, GB1522724.2, dated Jun. 7, 2016, 5 pages.

* cited by examiner

VEHICLE HANDLING

CROSS-REFERENCE TO RELATED APPLICATIONS

This application is a 371 of International Application No. PCT/EP2016/080843, filed Dec. 13, 2016, which claims priority to GB Patent Application 1522724.2, filed Dec. 23, 2015, the contents of both of which are incorporated by reference herein in their entirety.

TECHNICAL FIELD

The present disclosure relates to improvements to vehicle handling and particularly, but not exclusively, the reduction of degradation of vehicle driving dynamics. Aspects of the invention relate to a system and a method for determining the manner in which a vehicle is driven, and to a vehicle comprising a system for determining the manner in which a vehicle is driven.

BACKGROUND

The ground clearance or ride height of a motor vehicle may be altered by adjusting the suspension of the motor vehicle. There are many advantages to lowering the ride height or suspension of a vehicle. For instance, it is known that the aerodynamic performance of a vehicle can be improved if the vehicle body sits lower to the surface over which the vehicle is travelling. This is because the reduced air flow passing between the vehicle undercarriage and the surface results in reduced vehicle drag. In turn, this can improve the vehicle's fuel efficiency.

Lowering the ride height can also improve the traction and/or handling of the vehicle. The lowered centre of gravity reduces longitudinal and lateral weight transfer in dynamic manoeuvres, which leads to reduced variation in tyre contact force which is known to improve grip. A lower centre of gravity also decreases the chances of the vehicle rolling over when cornering or in the case of clipping a curve.

A further advantage of ride height lowering is increased driver comfort. Many drivers prefer the reduction in the tendency for the vehicle to roll when ride height is lower. Furthermore, reducing the ride height improves a vehicle's stability when subjected to side-winds. Also, many people believe that a lowered ride height improves the aesthetics of a vehicle.

Prior art systems are designed to lower a vehicle's ride height automatically upon the vehicle speed rising above a predetermined value. This is known in the art as "adaptive suspension". One example is used by Mercedes-Benz, which it refers to as "active body control (ABC)". ABC lowers a vehicle's ride height by up to 11 mm at speeds over 60 km/h.

However, it is not always desirable for the ride height to be lowered because lowering the ride height of a vehicle may have a negative impact on vehicle dynamics. Lowering the ride height of a vehicle lowers the vehicle's roll centre height, which is due to the consequential migration of the kinematic roll centre of the vehicle. In a lowered configuration, the vehicle chassis is closer to the spring aids and further from the rebound springs. Accordingly, in the lowered configuration, the vehicle resides in a more non-linear portion of the wheel rate curves which adversely affects the driving experience.

When a vehicle with lowered suspension is driven in a dynamic driving environment which requires the speed and direction of a vehicle to change significantly and regularly, for example on a winding country lane, there is degradation in the vehicle dynamics. Steering feel is degraded and the effort required to steer may be altered. Furthermore, the linearity in steering response may be affected. There may be a reduction in linearity of handling balance with lateral acceleration due to the change in height in relation to the spring aid contacts. The change in height in relation to the spring aid contacts typically reduces ride comfort. In short, a vehicle is optimised to be driven at a standard ride height; any deviation from the standard ride height is detrimental to the driving experience.

"Spirited driving" and "dynamic driving" are terms used in the art to describe a style of driving in which the direction and/or speed of a vehicle are adjusted regularly and sometimes abruptly in dynamic driving environments.

International Patent Application Publication Number WO 2013/004764 describes a system and method for controlling subsystems of a vehicle by evaluating the driving style of the driver of a vehicle.

The present invention has been devised to mitigate or overcome the above-mentioned problem and address disadvantages associated with the prior art.

SUMMARY OF THE INVENTION

According to an aspect of the present invention there is provided a system for determining the manner in which a vehicle is driven. The system may comprise a processor comprising an input configured to receive dynamic ride data from at least one on-board vehicle dynamic ride sensor. The processor may be configured (i) to calculate an output signal which is indicative of whether the dynamic ride data exceeds at least one dynamic ride data threshold value for a predetermined period of time; and may be configured (ii) to compare the output signal with at least one output threshold to determine the manner in which the vehicle is driven. The processor may comprise an output configured to send a control signal. The control signal may be sent to one or more vehicle components which may be or may comprise a vehicle suspension system. The control signal may inhibit adjustment of the ride height of the vehicle. The control signal may inhibit lowering of the ride height of the vehicle. The control signal may constrain or restrict the ride height of the vehicle to a raised configuration. The control signal may be indicative of the manner in which the vehicle is driven.

The invention enables the manner in which the vehicle is driven to be determined quickly and efficiently, thereby allowing the control signal to be sent to the vehicle components. If the invention determines that the vehicle is being dynamically driven, the invention may inhibit adjustment of the ride height of the vehicle, which mitigates degradation in vehicle dynamics when the vehicle is driven dynamically.

For example, if the invention detects that the vehicle is being driven dynamically, the control signal may be sent to the vehicle's suspension system or components thereof which raise, or are instructed to raise, the ride height of the vehicle if it is a lowered configuration, or which maintain, or are instructed to maintain, the raised configuration if the suspension components are already in that configuration. Maintaining, or being instructed to maintain, the raised configuration may comprise the vehicle suspension system, or the components thereof, inhibiting, or being instructed to inhibit or restrict, lowering of the vehicle ride height. The vehicle suspension components may include one or more of suspension springs, shock absorbers, controllers and linkages.

The exceeding of the at least one dynamic data threshold event by the dynamic ride data may be indicative of the vehicle being driven dynamically and may be referred to as a dynamic driving event. One or more instances of the dynamic ride data exceeding the at least one dynamic ride data threshold may cause the output signal to exceed the output threshold. For example, a plurality of closely related dynamic driving events may cause the output signal to exceed the output threshold. The invention is further advantageous in that the invention is highly accurate in detecting dynamic driving events and determining if dynamic driving is taking place.

The processor may be configured to apply a boost value to the output signal if the dynamic ride data exceeds the at least one dynamic ride data threshold value for a predetermined period of time. The processor may comprise a boost module arranged to apply the boost value to the output signal.

Preferably, the processor has at least one exponentially weighted moving average filter configured to calculate a moving average of the dynamic ride data at predetermined intervals and to apply exponential weights to the calculated moving averages so as to calculate the output signal.

The exponentially weighted moving average filter may takes a sample of dynamic ride data over a predetermined period of time which may be used to calculate the moving average of the dynamic ride data. The invention may apply a weight to the dynamic ride data so that recent data has a greater weight than less recent data.

In an optional embodiment, the predetermined period of time may be five seconds. In a further optional embodiment, the predetermined interval may be five milliseconds (5 ms). Optionally, the moving average of the dynamic ride data may be calculated at each predetermined interval.

The at least one output threshold may include an ON/OFF threshold value. Any value of the output signal above the corresponding ON/OFF threshold value may be indicative of dynamic driving. Any value of the output signal below the corresponding ON/OFF threshold value may be indicative of non-dynamic driving. The processor may determine that vehicle ride height lowering should be inhibited when the output signal is above the corresponding ON/OFF threshold.

The at least one output threshold may include an ON threshold value, wherein a temporal increase in the output signal from below the corresponding ON threshold to above the corresponding ON threshold may be indicative of dynamic driving. The at least one output threshold may include an OFF threshold value. The OFF threshold value may be less than the corresponding ON threshold value. A temporal decrease in the output signal from above the corresponding OFF threshold to below the corresponding OFF threshold may be indicative of a non-dynamic driving.

The system may comprise a memory device. The memory device may be configured to store at least one dynamic ride data threshold value for the, or each, ride attribute sensor. The processor may be configured to access the memory device and execute instructions stored therein such that it is operable to calculate the output signal to determine whether the vehicle is being driven in a dynamic manner or non-dynamic manner, and to inhibit lowering of the ride height of the vehicle when it is determined that the vehicle is being driven in a dynamic manner.

The processor may comprise an electronic processor having an electrical input for receiving the dynamic ride data. The memory device may comprise an electronic data memory electrically coupled to the electronic processor and having instructions stored therein.

The control signal may be or comprise a Boolean operator. The system may comprise a module for converting the output signal into the Boolean operator. The Boolean operator may be an indicator of whether the output signal exceeds the at least one output threshold. The indicator may indicate if the vehicle is being driven dynamically or non-dynamically. The control signal may be an analogue signal which denotes the degree of dynamic driving, which may be above one or more of the at least one output threshold.

The input may be configured to receive vehicle speed data from a vehicle speed sensor. The processor may be configured to determine the at least one dynamic ride data threshold value for the detected vehicle speed data. The processor may be configured to determine whether the vehicle speed is greater than a speed threshold value. The processor may be arranged to send the control signal only if the vehicle speed is greater than a speed threshold value.

The processor may have at least one absolute value calculator configured to calculate the absolute value of the dynamic ride data. The absolute value is the magnitude of the dynamic ride data regardless of direction of the forces experienced by the vehicle or whether the dynamic ride data is positive or negative. The dynamic ride data may include a measure of vehicle lateral acceleration. The dynamic ride data may be received from at least one sensor in an inertial management unit.

The at least one on-board vehicle dynamic ride sensor may comprise an inertial management unit. The dynamic ride data may be received from at least one on-board vehicle ride attribute sensors. The ride height of the vehicle may be configurable between at least two vehicle ride height positions. The processor may be configured to compare the output signal with the corresponding output signal threshold value to determine whether to inhibit ride height lowering of the vehicle to at least one lowered vehicle ride height position.

In an optional embodiment, when the vehicle ride height has been lowered to a lowered position, the processor may be configured to send a control signal to raise the ride height to a raised position when it is determined that the vehicle is being driven dynamically.

According to a further aspect of the present invention there is provided, a method of determining the manner in which a vehicle is driven. The method may comprise receiving dynamic ride data from at least one on-board vehicle dynamic ride sensor. The method may further comprise processing the dynamic ride data to produce an output signal which is indicative of whether the dynamic ride data exceeds at least one dynamic ride data threshold value for a predetermined period of time. The method may further comprise comparing the output signal with at least one output threshold to determine the manner in which the vehicle is driven. The method may comprise generating a control signal indicative of the manner in which the vehicle is driven. The control signal may be sent to inhibit adjustment of the ride height of the vehicle. The control signal may inhibit lowering of the ride height of the vehicle. The control signal may constrain or restrict the ride height of the vehicle to a raised configuration.

The processing step may comprise comparing the dynamic ride data with at least one dynamic ride data threshold value. The method may comprise boosting the output signal if the length of time the dynamic ride data remains above the at least one dynamic ride data threshold value for a predetermined period of time.

The output signal may decay according to an exponentially weighted moving average filter applied to the dynamic ride data.

The method may comprise detecting the speed of the vehicle. The method may comprise determining a dynamic ride data threshold value for the detected speed of the vehicle. The method may comprise determining if the vehicle is driven dynamically or non-dynamically. The method may comprise sending the control signal to one or more vehicle suspension components in dependence on the determination of whether the vehicle is being driven dynamically or non-dynamically. If the determination is that the vehicle is being driven dynamically, the method may comprise inhibiting lowering of the vehicle ride height.

According to a further aspect of the present invention there is provided a non-transitory, computer-readable storage medium. The storage medium may store instructions thereon that when executed by one or more processors causes the one or more processors to carry out the above method.

According to a further aspect of the present invention there is provided a vehicle comprising a system described above.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

In an embodiment of the present invention, a system determines the manner in which a vehicle is driven. The determination, together with the vehicle speed, is used to determine whether the vehicle ride height should be raised, lowered, maintained, or if adaptive suspension should be inhibited.

Figure 1A:
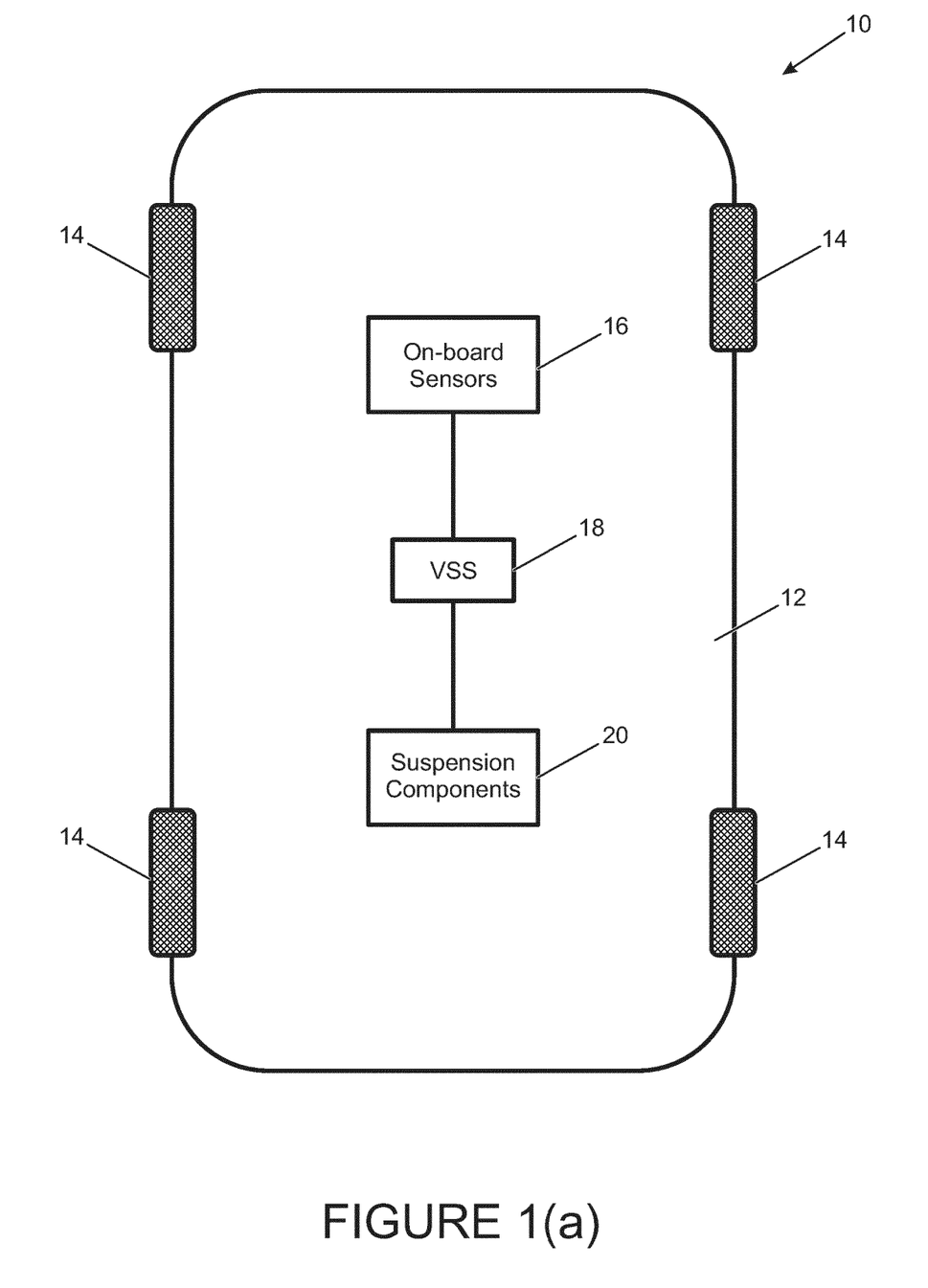
FIG. 1(a) shows a schematic overhead view of a vehicle including a vehicle suspension system (VSS) according to an embodiment of the present invention, the vehicle also including on-board sensors and suspension components.

FIG. 1(a) shows an overhead view of a vehicle 10 that includes a vehicle body 12 and four wheels 14. The vehicle 10 also includes one or more on-board vehicle sensors 16a, 16b, an adaptive vehicle suspension system (VSS) 18 according to an embodiment of the present invention, and adaptive vehicle suspension components 20. The suspension components 20 includes one or more components that connect the wheels 14 to the rest of the vehicle 10 in order to cause the vehicle ride height to be raised or lowered. These components 20 may include suspension springs, shock absorbers and linkages.

Figure 1B:
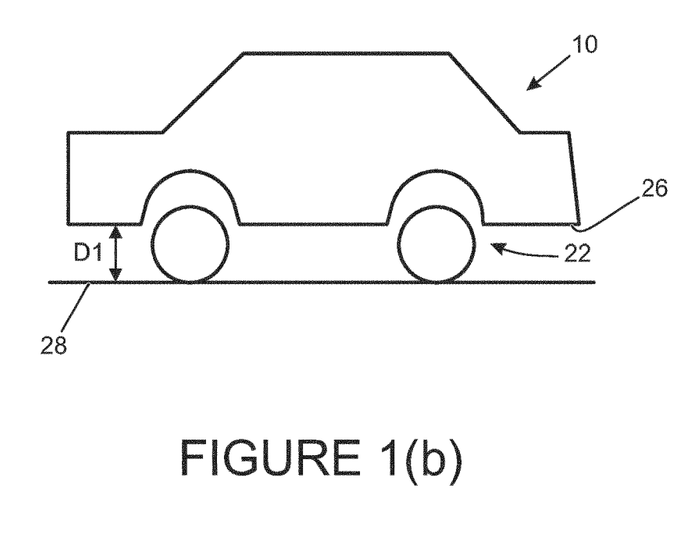
FIG. 1(b) shows a side view of the vehicle shown in FIG. 1 in a raised position.
Figure 1C:
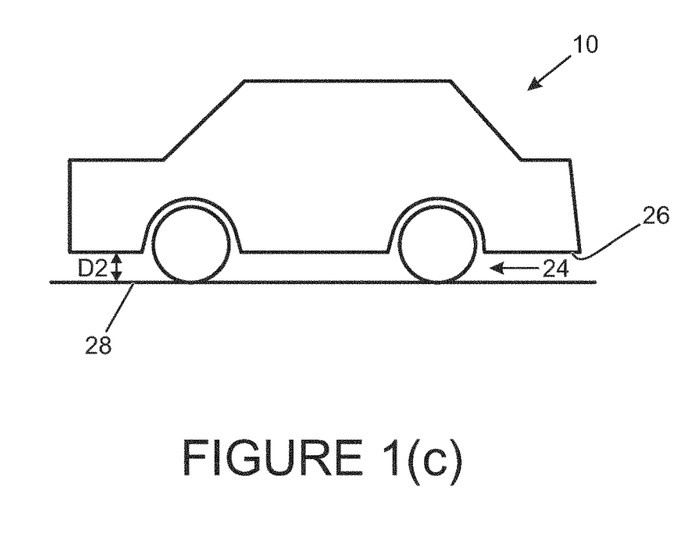
FIG. 1(c) shows a side view of the vehicle shown in FIG. 1 in a lowered position.

FIGS. 1(b) and 1(c) show side views of the vehicle 10 in 'raised' and 'lowered' positions 22, 24, respectively. In the raised position 22, the undercarriage 26 of the vehicle body 12 is positioned a first distance D1 from the surface 28 over which the vehicle 10 is travelling. In the lowered position 24, the undercarriage 26 of the vehicle body 12 is positioned a second distance D2 from the surface 28, where D2 is less than D1. Typically, the difference between D1 and D2 may be between about 5 mm and 50 mm, and more specifically may be about 15 mm, although the difference may be any other appropriate value.

The VSS 18 can cause the vehicle body 12 to be raised or lowered relative to the wheels 14, between ride height positions 22, 24 by sending control signals to the suspension components 20. For instance, to adjust the ride height of the vehicle 10 between the raised and lowered positions 22, 24, the VSS 18 may cause a change in the volume of air of an air compressor suspension component (for a vehicle that uses air suspension).

Figure 2:
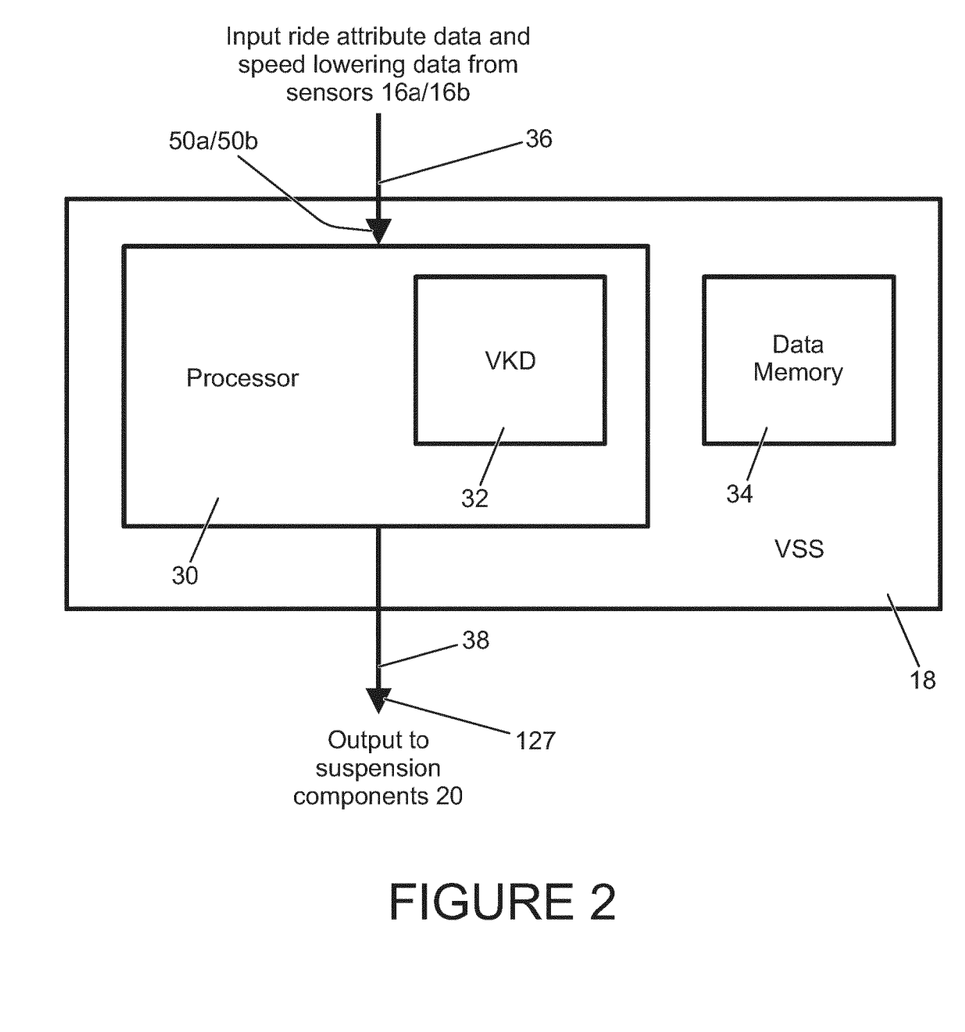
FIG. 2 shows the component parts of the VSS shown in FIG. 1, together with the inputs to, and outputs from, the VSS.

FIG. 2 shows the VSS 18 in greater detail. The VSS 18 includes a processor 30 for determining whether the ride height of the vehicle 10 should be adjusted between the raised and lowered positions 22, 24. The processor 30 includes a vehicle kinetic dynamics (VKD) module 32. The VKD 32 is for determining whether the vehicle is being driven dynamically in a dynamic driving environment or a non-dynamically in a sedate manner in a placid driving environment. The result of this determination is used by the processor 30 when determining whether ride height adjustment is needed.

The data processor 30 has an input 36 that is arranged and configured to receive dynamic ride data from the on-board sensors 16a, 16b. In particular, the processor 30 receives dynamic ride data 50a which is used by the VKD 32 to determine how the vehicle 10 is being driven. In the presently described embodiment, dynamic ride data 50a includes signals relating to the lateral acceleration and longitudinal acceleration acting on the vehicle 10. Lateral acceleration and longitudinal acceleration are known in the art as lateral G-force and longitudinal G-force. The on-board sensors 16a, 16b may include on-board vehicle dynamic ride sensors such as lateral acceleration sensors, or one or more inertia management unit (IMU) including accelerometers.

In further embodiments of the invention, the on-board sensors 16a, 16b may include separate vehicle roll rate, vehicle pitch rate and vehicle heave acceleration (i.e. vertical acceleration) sensors, or the roll, pitch and heave data may be received from a single inertia management unit (IMU) including a three-dimensional accelerometer. Alternatively, or in combination, the on-board sensors 16a, 16b may measure driver-induced roll as a measure of spirited driving by the driver. Furthermore, the on-board sensors 16a, 16b may include sensors to provide measurements of any combination of engine speed, steering wheel angle, steering wheel rate, yaw rate, wheel speed, wheel arch height above a wheel, longitudinal acceleration and throttle position. These further sensors and measurements provide further dynamic ride data 50a which may be processed in further embodiments of the invention.

The processor 30 also receives vehicle speed data 50b which is used to determine whether ride height adjustment is appropriate. The vehicle speed data 50b is obtained from a speed sensor 16b. In short, ride height lowering is generally appropriate only when the vehicle speed is greater than a threshold value. This is discussed in greater detail below.

The VSS 18 includes a data memory or memory device 34 having instructions stored therein, the data processor 30 being arranged to execute said instructions in order to determine how the vehicle is being driven, and to determine whether the ride height should be adjusted. The data memory 34 may be an electronic, non-transitory, computer-readable storage medium. The data memory 34 also includes predetermined vehicle ride attribute data, such as at least one dynamic ride data threshold value, and predetermined vehicle speed lowering data that is used by the processor 30 in order that the above determinations may be made.

The processor 30 has an output 38 that is configured to send a control signal 127 to the suspension components 20. The control signal 127 is indicative of the manner in which the vehicle is driven. Accordingly, when the control signal 127 is indicative of dynamic driving, upon receipt of the control signal 127 adjustment of the ride height of the vehicle 10 is inhibited so that the suspension components 20 do not switch the vehicle ride height from the raised position 22 to the lowered position 24. If the ride height of the vehicle 10 is in the lowered position 24 upon receipt of the control signal 127, the ride height is adjusted to the raised position 22. This is described in further detail below.

Figure 3A:
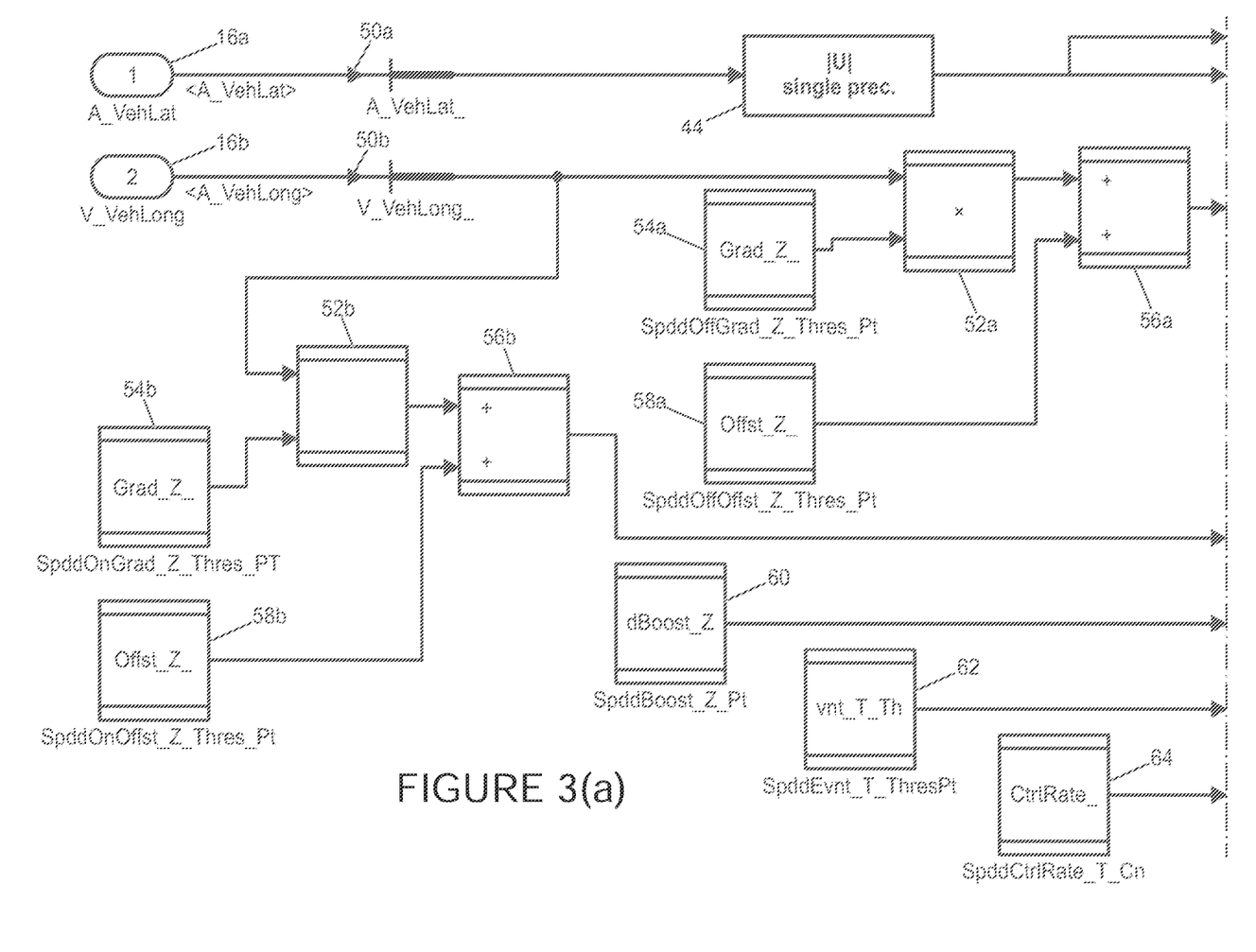
FIGS. 3(a)-3(c) show a vehicle kinetic dynamics (VKD) component part of the VSS of FIG. 2 in greater detail.
Figure 3B:
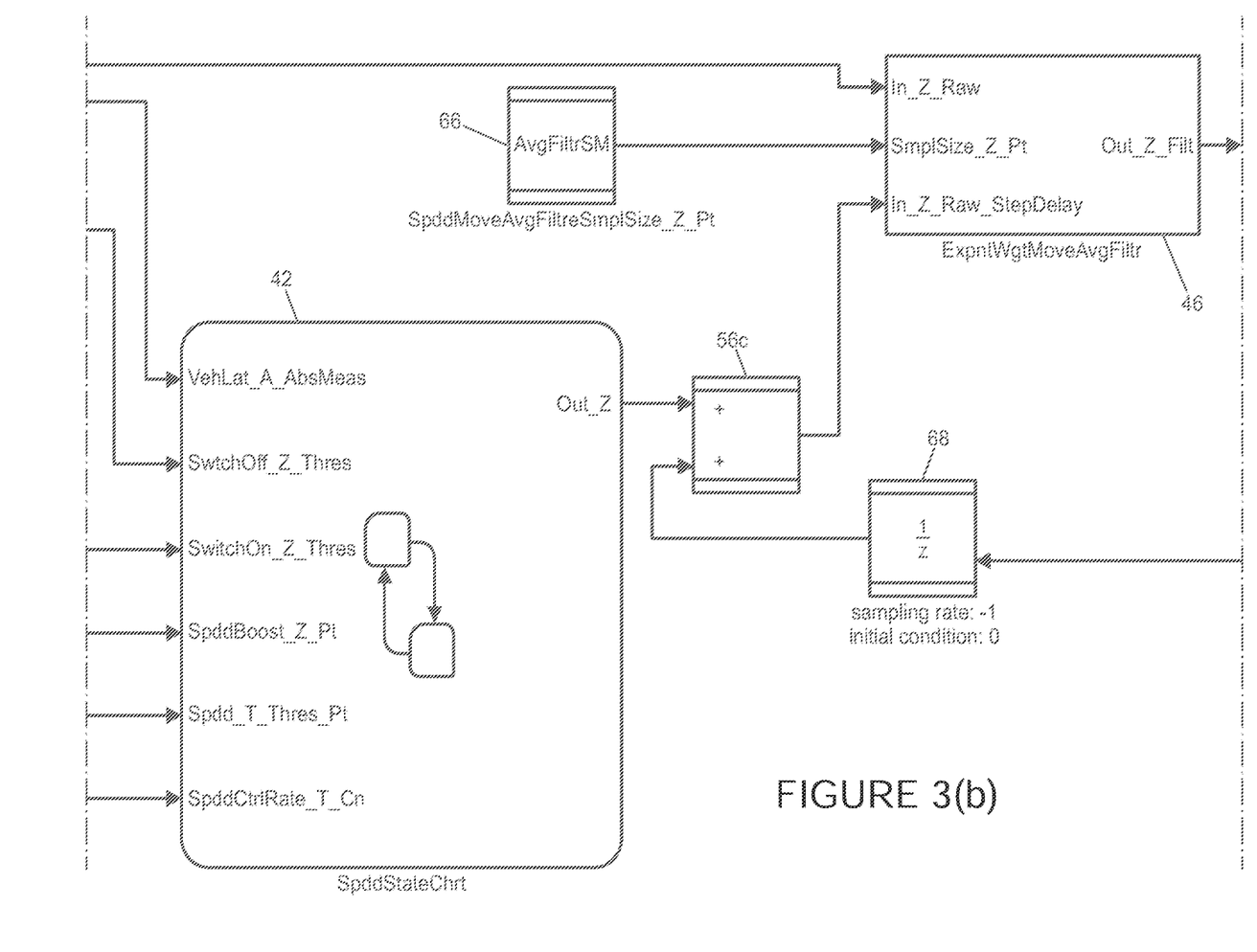
Figure 3C:
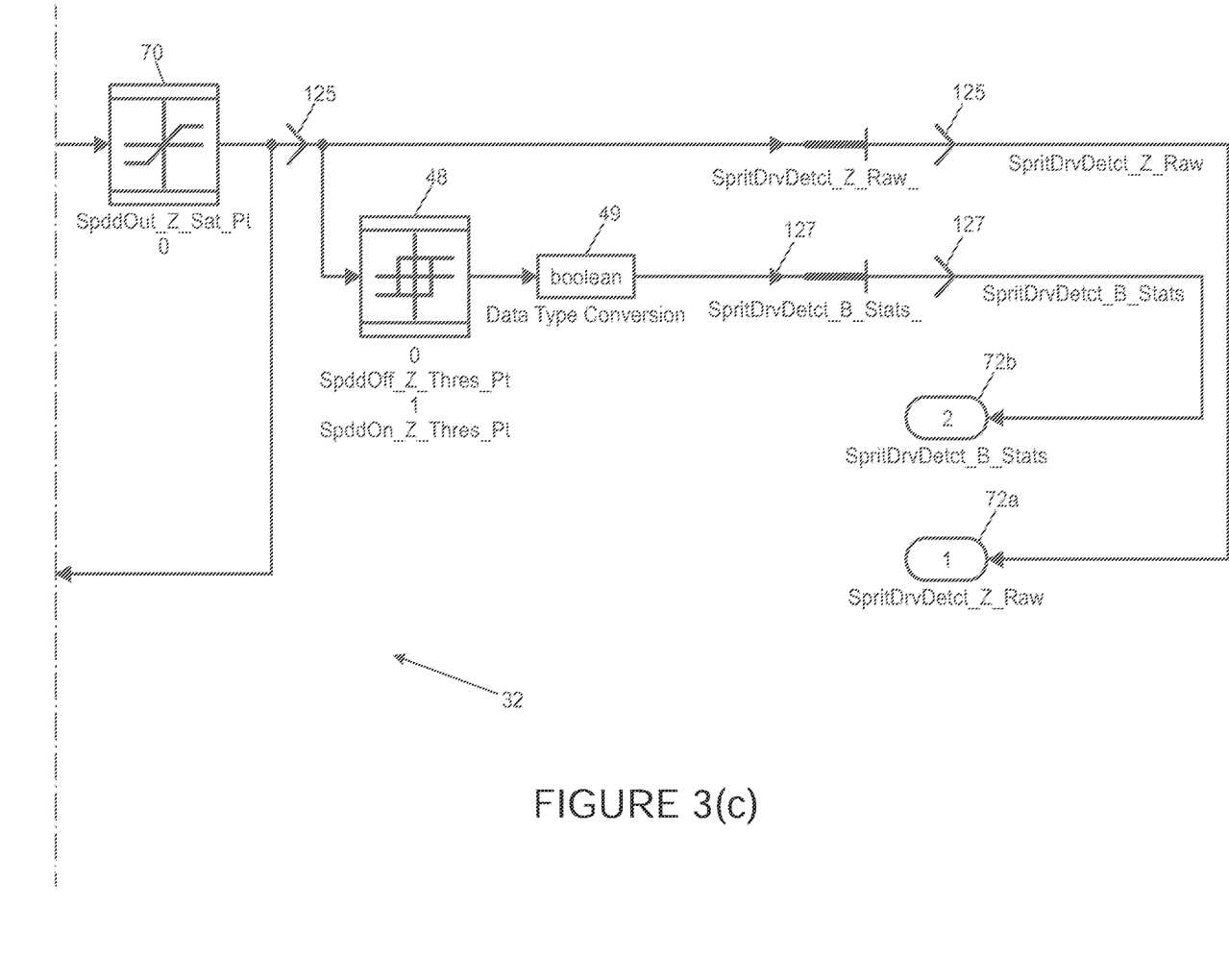

FIGS. 3(a)-3(c) show the structure of the VKD 32 in greater detail. The VKD 32 receives lateral acceleration (latacc) signals 50a via the lateral acceleration sensor 16a, and vehicle speed signals 50b via the speed sensor 16b. The lateral acceleration signals 50a and the vehicle speed signals 50b are processed in parallel.

The lateral acceleration signals 50a can include both positive and negative values, corresponding to lateral acceleration of the vehicle 10 in both the left and right directions. For the purposes of analysing the signal, the absolute value of each lateral acceleration value, i.e. the magnitude of each lateral acceleration value regardless of direction, is determined and output by an absolute value calculator 44. The absolute latacc value is passed to an exponentially weighted moving average filter 46 and a state flow chart 42.

The exponentially weighted moving average filter 46 acts to ensure the lateral acceleration signals 50a most recently received by the processor 30 have a higher weighting when analysing them for dynamic driving. This helps the VKD 32 to react more quickly to changes in driving dynamics, and to improve the consistency of driving dynamics determination. In particular, the average of the most recent n processed signal values is calculated. Then, the oldest values are discarded and replaced with newly received values, a, where a<n, and the new average is calculated. This process repeats and the calculated averages are referred to as moving averages. Weights are applied to these calculated moving averages, where the weights decrease exponentially in the direction of averages relating to older received signals.

The exponentially weighted moving average filter 46 receives inputs of the processed lateral acceleration signals 50a from the absolute value calculator 44 and the moving average sample size from the moving average filter module 66 (i.e. the value of n). The moving average values are calculated at predefined intervals. For example, if the predefined interval is 5 ms, the moving average value is calculated every 5 ms. The number of samples that is averaged is defined in terms of time. In the present embodiment of the invention the time period is five seconds, but may be calibrated to another length of time. Accordingly, the number of samples that is averaged every 5 ms in the present embodiment of the invention is one thousand. The calculated average values are then output by the filter 46.

Turning now to the vehicle speed signals 50b, each vehicle speed signal 50b is forwarded to a first comparison module 52a and a second comparison module 52b. The first comparison module 52a compares the vehicle speed signal 50b with an OFF threshold provided by a first OFF threshold module 54a. The OFF threshold is the speed at which adaptive suspension is not inhibited. The second comparison module 52b compares the vehicle speed signal 50b and an ON threshold module 54b. The ON threshold is the speed at which adaptive suspension is inhibited.

The results of the OFF and ON threshold modules 54a, 54b are forwarded to respective addition modules 56a, 56b. Each addition module 56a, 56b combines the result of the respective OFF or ON threshold module 54a, 54b with an offset threshold provided by offset threshold modules 58a, 58b. The result of the first addition module 56a provides the signal in relation to the threshold for switching off the adaptive suspension; and result of the second addition module 56b provides the signal in relation to the threshold for switching on the adaptive suspension.

The output from the comparison modules 52a, 52b and the addition modules 56a, 56b each form a straight line equation y=mx+c, where m is the gradient of the line and c is the offset. The gradients, m, are specified by the OFF and ON threshold modules 54a, 54b, and the offsets, c, are specified by the offset threshold modules 58a, 58b. The straight lines then form the threshold equation, where x is the vehicle speed and y is the lateral acceleration. The resulting straight line is a plot of lateral acceleration threshold against speed. A lateral acceleration event which is above the lateral acceleration threshold for a given speed indicates a dynamic driving event.

In addition to receiving the absolute latacc value from absolute value calculator 44, the state flow chart 42 receives (i) a signal from the OFF threshold addition module 56a; (ii) a signal the ON threshold addition module 56b; (iii) a boost value from a boost module 60; (vi) an output signal threshold value and a predetermined ON threshold time value from output signal threshold module 62; and (v) the sampling frequency of the speed and absolute latacc values from module 64.

The state flow chart 42 processes its inputs to determine if the vehicle 10 is being dynamically driven. In this respect, the state flow chart 42 monitors the absolute latacc value from the absolute value calculator 44 and, in particular, how long the lateral acceleration remains above the ON threshold specified by the ON threshold module 54b.

The result of the analysis of the state flow chart 42 is forwarded to a third addition module 56c, which combines the result of the state flow chart 42 with the output of a step delay module 68. The result of the third addition module 56c is forwarded to the weighted moving average filter 46. The weighted moving average filter 46 also receives a moving average filter sample size from moving average filter module 66.

If the lateral acceleration exceeds the ON threshold for the predetermined ON threshold time value, the boost value provided by the boost module 60 is added to the weighted moving average signal of the lateral acceleration, i.e. the signal output of the exponentially weighted moving average filter 46.

The result of the weighted moving average filter 46 is forwarded to module 70. The output of module 70 calculates an output signal 125 which is indicative of whether the lateral acceleration exceeds the ON threshold for the predetermined ON threshold time value. The output signal 125 may be monitored by an external device 72a. Module 70 forwards its result to the sampling rate module 68 and the relay block 48.

The relay block 48 forwards the output signal 125 associated with the lateral acceleration of the vehicle 10 to a Boolean converter 49. The output signal 125 is compared with a preconfigured threshold to determine the manner in which the vehicle 10 is driven. If the output signal 125 exceeds the preconfigured threshold, the Boolean converter 49 converts the output signal 125 to a Boolean operator which is a control signal 127 in the form of a spirited driving flag indicating if the vehicle is being dynamically or non-dynamically driven. The output of the Boolean converter 49 is monitored by an external device 72b.

In an alternative embodiment of the invention, the output signal 125 may be passed through an analogue converter (not shown) which produces an analogue control signal (not shown) which denotes the degree of dynamic driving that the vehicle 10 is undergoing.

In the present embodiment of the invention, the external device 72b is the suspension components 20. On receipt of a Boolean operator indicating that the vehicle is being driven dynamically, i.e. the spirited driving flag is set to ON, the suspension components 20 will inhibit lowering of the adaptive suspension. Alternatively, on receipt of a Boolean operator indicating that the vehicle is being driven non-dynamically, i.e. the spirited driving flag is set to OFF, the suspension components 20 will not inhibit lowering of the adaptive suspension.

Figure 4:
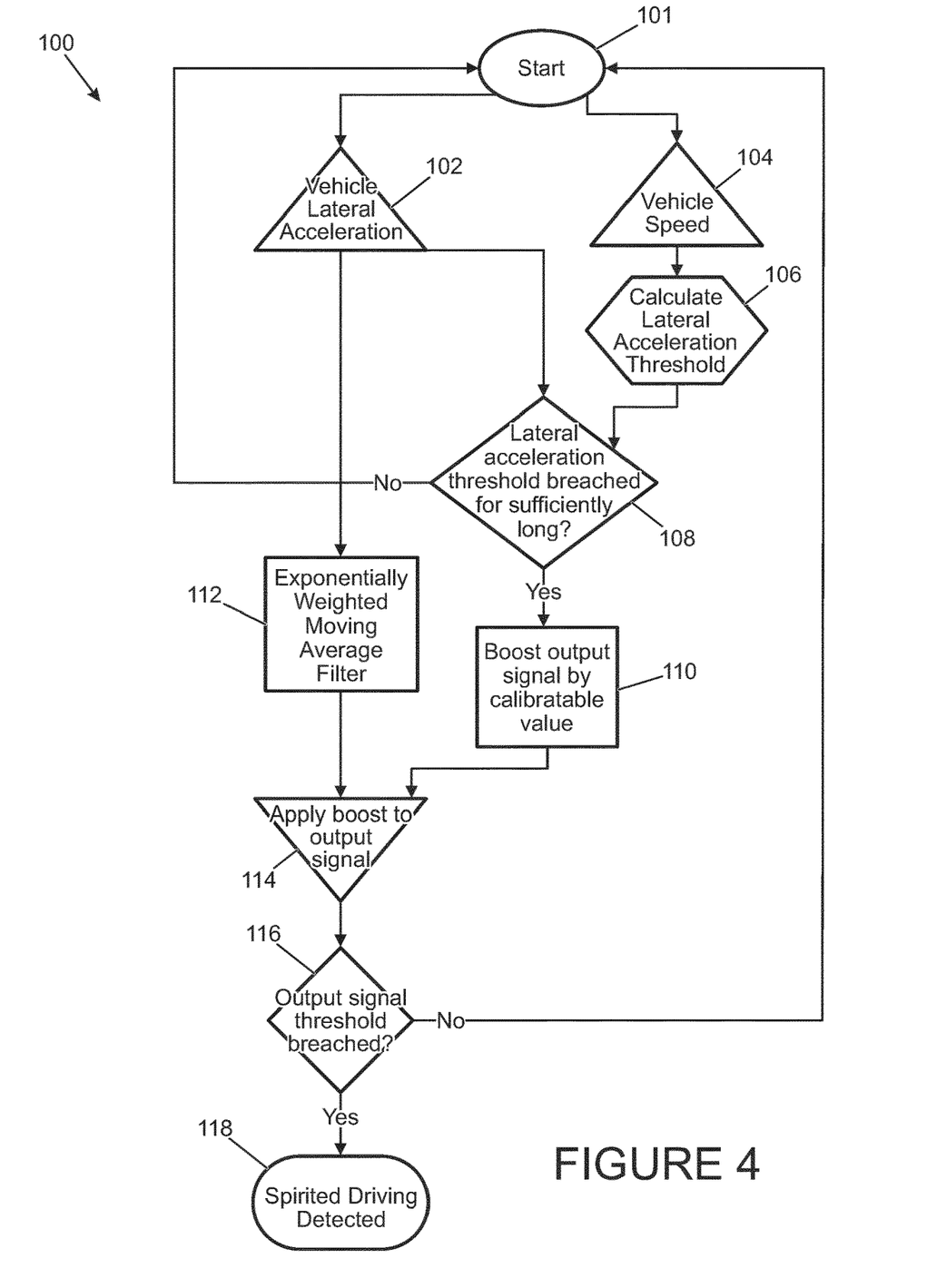
FIG. 4 shows a method undertaken by the VKD of FIGS. 3(a)-3(c) for determining whether the vehicle is being operated dynamically.

FIG. 4 illustrates a method 100 of determining the manner in which a vehicle 10 is driven. The method 100 is undertaken by the VKD 32 to determine whether the vehicle 10 is being driven dynamically. The method starts at step 101. At step 102, the VKD 32 of the processor 30 receives dynamic ride data 50a which comprises the measured lateral acceleration of the vehicle 10 from at least one on-board vehicle dynamic ride sensor 16a. In the presently described embodiment, the at least one on-board vehicle dynamic ride sensor 16a is lateral acceleration sensor 16a generating dynamic ride data 50a in the form of one or more lateral acceleration signals. At step 104, the VKD 32 of the processor 30 receives the measured speed of the vehicle 10 from the speed sensor 16b. Typically, the sampling frequency of these signals may be 200 Hz, but any other suitable value may be used, such as 100 Hz.

At step 106, the VKD 32 determines the lateral acceleration threshold for the speed detected by the speed sensor 16b. If the dynamic ride data 50a, which in the presently described embodiment is the lateral acceleration of the vehicle of step 102, exceeds at least one dynamic ride data threshold value, which in the current embodiment is the lateral acceleration threshold, the state flow chart 42, at step 108, determines the length of time the lateral acceleration threshold has been above the threshold. If the length of time exceeds a predetermined length of time stored in output signal threshold module 62, a calibratable boost value is applied to the output signal at step 110 by the value stored in the boost module 60.

As mentioned above, the moving average filter 46 averages lateral acceleration (latacc) signals 50a received from the lateral acceleration sensor 16a. If the lateral acceleration of the vehicle of step 102 is above the lateral acceleration threshold, the exponentially weighted moving average filter is applied to the lateral acceleration signal at step 112 by the weighted moving average filter 46.

At step 114 the state flow chart 42 combines the result of the exponentially weighted moving average filter applied at step 112, and the boost value is applied to the output signal at step 110. At step 116, the output signal is compared to at least one output threshold by the state flow chart 42 to see if the threshold has been breached to determine the manner in which the vehicle 10 is driven. If the threshold has been breached, the car is considered to be driven dynamically, i.e. spirited driving is detected, as shown at step 118. Accordingly, the output signal 125 is indicative of whether the dynamic ride data exceeds the at least one dynamic ride data threshold value for a predetermined length of time. If the threshold has not been breached, the method 100 begins again at the start, i.e. at step 101.

Figure 5:
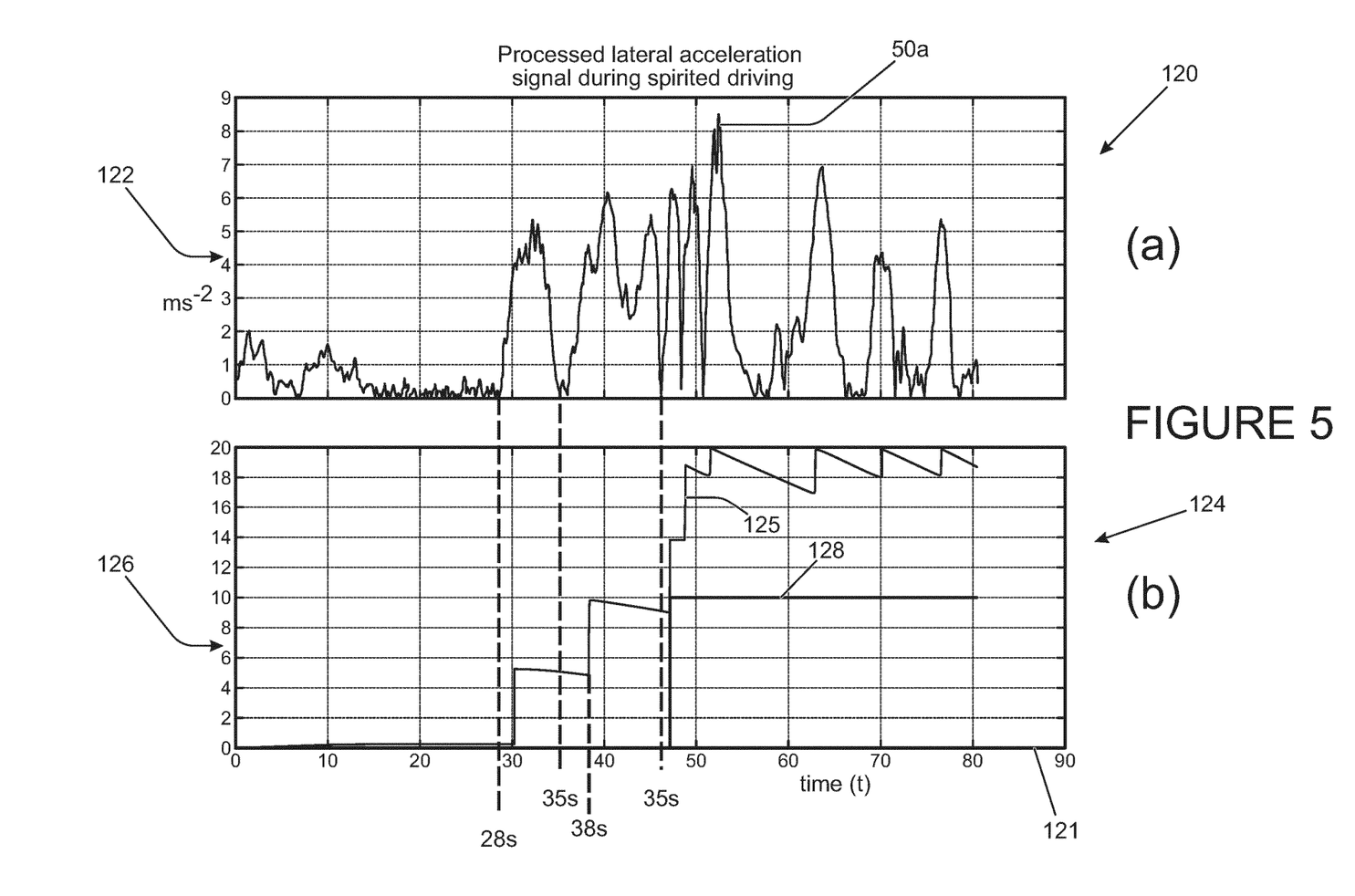
FIG. 5(a) shows a plot of lateral acceleration data against time for part of a journey of a vehicle, the lateral acceleration data is based on measurements by at least one on-board sensor of FIG. 1.
FIG. 5(b) shows the determination of whether the vehicle is being driven dynamically based on the data shown in FIG. 5(a)

FIGS. 5(a) and 5(b) illustrate the above method in graphical form. FIG. 5(a) shows a graph 120 of lateral acceleration data signals 50a against time for part of a journey of the vehicle 10. The y-axis 122 indicates the magnitude of an absolute raw lateral acceleration signal 50a. The plot of the graph 120 indicates the magnitude of the lateral acceleration signal 50a at the time in seconds along the x-axis 121 of the lateral acceleration graph 120.

FIG. 5(b) shows a graph 124 of the output signal 125 of the state flow chart 42 against time for the journey of the vehicle 10 shown in FIG. 5(a). The y-axis 126 indicates the output signal of the state flow chart 42 at the points in time indicated by the x-axis 121 of the output graph 124.

The graph 122 of lateral acceleration shown in FIG. 5(a) illustrates that the vehicle 10 is undergoing relatively small lateral acceleration, i.e. an absolute raw signal strength of between zero and two, until around 28 seconds. After 28 seconds the signal strength rapidly rises to around four, hovers between around 3.8 and 5.4 for about 4 seconds, before dropping rapidly to zero at around 35 seconds.

In the present embodment of the invention the lateral acceleration ON threshold is set at 3.8 ms$^{-2}$ (at 96 kph). The raw lateral acceleration signal 50a exceeds the ON threshold between around 28 seconds and around 35 seconds, which indicates that the vehicle 10 is being subjected to a high lateral acceleration. The length of time the raw lateral acceleration signal 50a exceeds the ON threshold is longer than the predetermined length of time stored in the boost module 60, an individual event of dynamic driving is detected. As mentioned above, he threshold value varies with respect to the speed of the vehicle.

The graph 124 of the output signal 125 shown in FIG. 5(b) indicates that the boost is applied to the output signal by the boost module 60 shortly after 30 seconds from the start of the analysis. At this point the output signal 125 is raised from zero to five. The output signal 125 is maintained at five for between 2 and 3 seconds while the dynamic driving takes place, before decaying. The rate of decay is a function of the exponentially weighted moving average of the absolute lateral acceleration value averaged over five seconds. When the boost is applied shortly after 30 seconds, the average absolute latacc was low. Therefore, the decay rate is slow.

Before a further boost may be applied to the raw signal 50a, the raw signal 50a must drop below an OFF threshold, which is 1.5 ms$^{-2}$ in this embodiment before a boost can be applied to the output signal 125 again. At 36 seconds the raw signal 50a rises rapidly from zero to around 6.2 to breach the ON threshold. A further boost is applied to the output signal 125 at 38 seconds to raise the output signal 125 to ten. The raw signal 50a falls to zero at 46 seconds before quickly rising to around 6.3 at around 47 seconds. Consequently, a third boost is applied to the output signal 50a at around 47 seconds, raising the output signal to 14.

In the presently described embodiment, a number of spirited driving events occur within a certain timeframe before the vehicle 10 is considered by the system to be dynamically driven. In the presently described embodiment of the invention, the dynamic driving threshold value is set at ten. As mentioned above, the third detection of dynamic driving raises the output signal to ten and triggers the spirited driving flag to be set to ON, i.e. the Boolean output of Boolean converter 49 is set to 1.

An ON state inhibits lowering the vehicle ride height, or, if the vehicle ride height is already in the lowered position, the ON state will cause the vehicle ride height to raise to the normal ride height. The spirited driving flag is indicated by a Boolean function output line which is switched from zero to 1 when the averaged lateral acceleration signal, boosted by individual spirited driving events, exceeds a preconfigured threshold value 128. In FIG. 5(b) the preconfigured threshold value is 10. In the example shown in FIGS. 5(a) and 5(b), the individual spirited driving event that takes place at around 46 seconds causes the boosted output signal 125 to exceed the value of 10, thereby setting the Boolean function output to 1.

From around 47 seconds to the end of the plot of the signal 50a on the graph 120 of lateral acceleration, the raw signal 50a changes rapidly between zero and raw signals 50a relating to relatively high lateral acceleration forces. The rapid and large changes in the raw signal 50a are reflected in the output signal 125, to which a boost is applied every time a dynamic driving event is detected. The output signal 125 decays to the weighted moving average. The longer the timeframe over which the average is taken, the less responsive the decay rate is to the raw lateral acceleration signal 50a. As will be appreciated by the skilled person, a high average raw signal 50a results in a low rate of decay of the output signal 125, and a low average raw signal 50a results in a high rate of decay of the output signal 125. The output signal 125 is capped at twenty to prevent the output signal 125 being continually boosted so that it takes an excessive amount to time to fall below the OFF threshold from the relay block 48. If the output signal 125 is not capped, the suspension of the vehicle 10 may be in the raised configuration long after the dynamic driving events have ended.

The OFF threshold value is not equal to its respective ON threshold value in order to avoid any of the moving averages flickering between being indicative of dynamic driving and non-dynamic driving. This may be referred to as signal hysteresis. Flickering could lead to the ride height of the vehicle 10 being raised and lowered several times over a short period of time, which is wholly undesirable. This also takes into account that there will be a slight delay when moving between the raised and lowered positions 22, 24, i.e. this is a reactive system to maintain driver comfort.

The ON and OFF thresholds are calibrated prior to the system being used. The ON and OFF thresholds are based on what is accepted to be an 'acceptable' level of degradation in the driving dynamics of the vehicle, by a subjective assessor. For example, the ON and OFF thresholds will be calibrated so that any degradation is minimised.

The overall determination made by the VKD 32 as to whether the vehicle 10 is being driven dynamically is then used by the processor 30 to determine whether lowering of the adaptive suspension should be inhibited. In some embodiments the determination that the vehicle is being driven dynamically may also result in a vehicle ride height adjustment, i.e. raising of the vehicle ride height, if the ride height of the vehicle 10 is in the lowered configuration.

Figure 6:
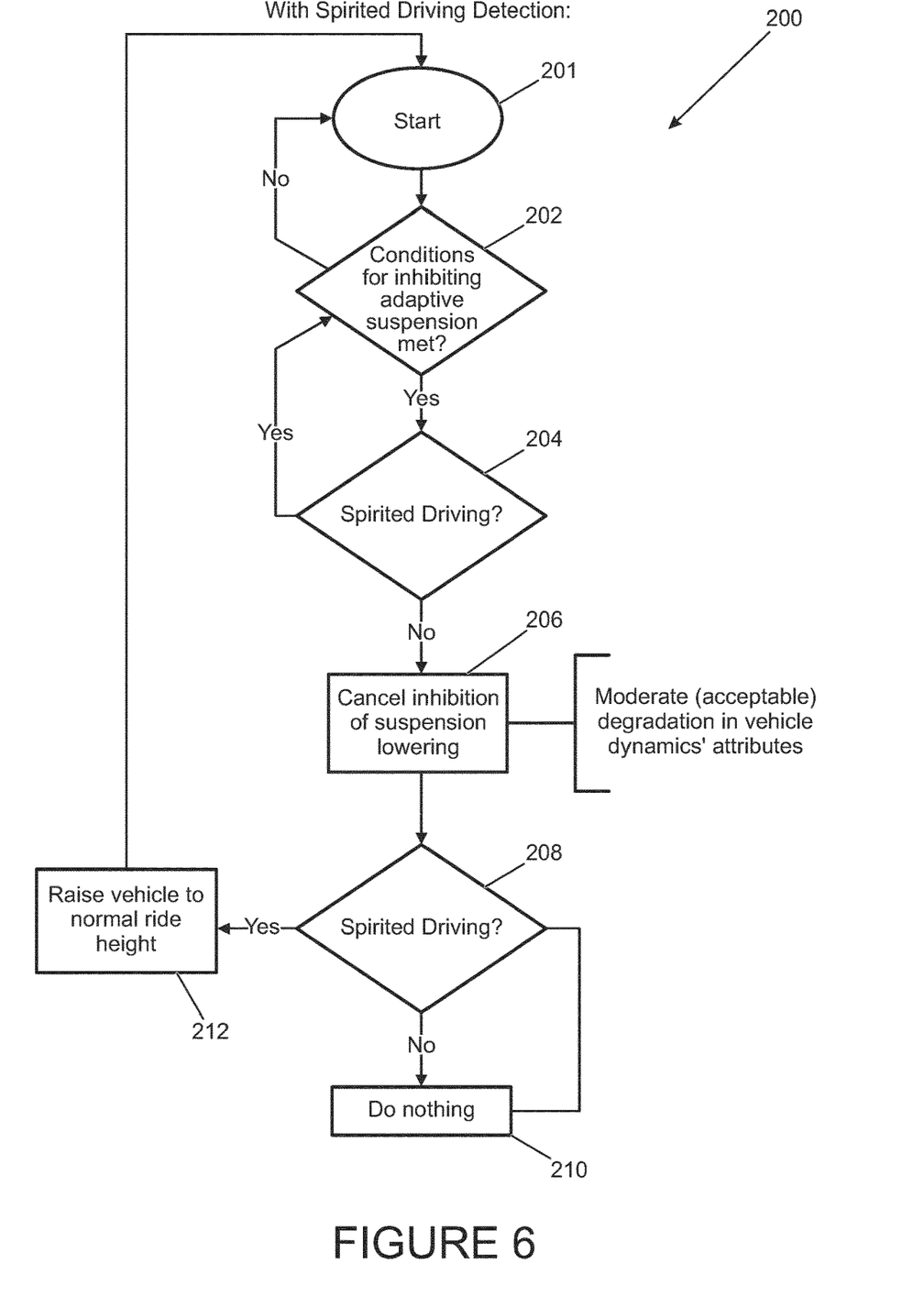
FIG. 6 shows a method undertaken by the VSS of FIG. 2 for determining whether the ride height of the vehicle of FIGS. 1(a), 1(b) and 1(c) should be adjusted.

FIG. 6 shows a method 200 undertaken by the processor 30 for determining whether lowering of the adaptive suspension should be inhibited. The method 200 starts at step 201 with the vehicle 10 in its raised position 22.

At step 202 the processor 30 determines whether the conditions for inhibiting adaptive suspension are met. In particular, the processor 30 receives the vehicle speed data 50b which is obtained from a speed sensor 16b. The processor 30 also retrieves a predetermined threshold value of vehicle speed that is stored in the data memory 34. Specifically, at step 202 the processor 30 determines whether the speed of the vehicle 10 is greater than or less than the predetermined threshold speed for initiating inhibiting the adaptive suspension.

If the speed of the vehicle 10 is less than the predetermined threshold speed then the conditions for inhibiting adaptive suspension are not met. Accordingly, the adaptive suspension is not inhibited, and the process returns to step 201.

If the speed of the vehicle 10 is greater than the predetermined threshold speed then the conditions for inhibiting adjustment of the ride height of the vehicle 10 are met, and the method 200 moves on to step 204.

At step 204 the processor 30 determines whether the vehicle 10 is being driven dynamically, i.e. whether the vehicle is undergoing spirited driving. In particular, the VKD 32 of the processor 30 determines whether the vehicle 10 is being driven dynamically according to the method 100 of FIG. 4 described above. The control signal 127 is sent to the suspension components 20, wherein the control signal 127 is indicative of the manner in which the vehicle 10 is driven.

Specifically, if the spirited driving flag is set to ON, it is determined that the vehicle 10 is being driven dynamically so the adaptive suspension should be inhibited. Accordingly, the ride height of the vehicle 10 is inhibited from moving from the raised position 22 to the lowered position 24. If the ride height of the vehicle 10 is in the lowered position 24 when the spirited driving flag is set to ON, the adaptive suspension reconfigures the ride height to the raised position 22 and is inhibited from returning to the lowered position 24 while the vehicle 10 is being driven dynamically. If the vehicle 10 is undergoing spirited driving, the process returns to step 202.

Alternatively, if it is determined that the vehicle 10 is not being driven dynamically, then at step 206 the VSS 18 outputs an alternative control signal (not shown) to the suspension components 20. The alternative control signal (not shown) does not inhibit the adaptive suspension. Accordingly, adaptive suspension may be active and control the ride height of the vehicle 10 in its usual manner. Therefore, any adjustment of the ride height of the vehicle 10 is not inhibited when the vehicle 10 is not being driven dynamically.

The vehicle 10 will then remain in the lowered position 24 until it is determined that the ride height should be raised to the raised position 22. In particular, at step 208 the processor 30 checks whether the vehicle 10 is being driven dynamically in a similar way to above.

If the vehicle is still determined to be driven non-dynamically the processor 30 does not send a control signal 127 to inhibit the adaptive suspension, and at step 210 loops back to step 208. However, if the vehicle 10 is determined to be driven dynamically then at step 212 the VSS 18 outputs a control signal 127 to the suspension components 20 to raise the ride height of the vehicle 10 from the lowered position 24 to the raised position 22, and to inhibit further operation of the adaptive suspension.

In the above-described embodiment, the vehicle 10 has two ride height positions, i.e. raised and lowered positions 22, 24. However, in other embodiments the vehicle may have more than two ride height positions. In such embodiments, the system may determine the degree of dynamic driving based on the degree of lateral acceleration. For instance, the system may control the suspension components 20 to adjust the ride height to a particular one of the three or more positions based on the determined degree of dynamic driving.

Many modifications may be made to the above examples without departing from the scope of the present invention as defined in the accompanying claims.

The invention claimed is:

1. A system for determining the manner in which a vehicle is driven, the system comprising:
    a processor comprising an input configured to receive lateral acceleration data from at least one on-board vehicle lateral acceleration sensor,
    wherein the processor is configured:
        (i) to calculate an output signal from the received lateral acceleration data; and
        (ii) to compare the output signal with at least one output threshold to determine the manner in which the vehicle is driven; and
    the processor comprises an output configured to send a control signal to inhibit lowering of a ride height of the vehicle, wherein the control signal is indicative of the manner in which the vehicle is driven,
    the processor having at least one exponentially weighted moving average filter configured to calculate a moving average of the lateral acceleration data at predetermined intervals and to apply exponential weights to the calculated moving averages so as to calculate the output signal,
    wherein the processor is configured to apply a boost value to the output signal each time the lateral acceleration data exceeds at least one dynamic ride data threshold value for a predetermined period of time, and
    wherein the boosted output signal decays according to the at least one exponentially weighted moving average filter.

2. The system of claim 1, wherein one or more instances of the lateral acceleration data exceeding at least one lateral acceleration data threshold causes the output signal to exceed the output threshold.

3. The system of claim 1, wherein the processor is configured to access a memory device and execute instructions stored therein such that it is operable to calculate the output signal to determine whether the vehicle is being driven in a dynamic manner or non-dynamic manner, and to inhibit lowering of the ride height of the vehicle when it is determined that the vehicle is being driven in a dynamic manner.

4. The system of claim 1, wherein the processor comprises an electronic processor having an electrical input for receiving the lateral acceleration data.

5. The system of claim 1, wherein the input is configured to receive vehicle speed data from a vehicle speed sensor.

6. The system of claim 5, wherein the processor is configured to determine at least one lateral acceleration data threshold value for the detected vehicle speed data.

7. The system of claim 5, wherein the processor is arranged to send the control signal when the vehicle speed is greater than a speed threshold value.

8. The system of claim 1, wherein the at least one on-board vehicle lateral acceleration sensor comprises an inertial management unit.

9. The system of claim 1, wherein the ride height of the vehicle is configurable between at least two vehicle ride height positions.

10. The system of claim 1, wherein when the vehicle ride height has been lowered to a lowered position, the processor is configured to send a control signal to raise the ride height to a raised position when it is determined that the vehicle is being driven dynamically.

11. A method of determining the manner in which a vehicle is driven, the method comprising:
    receiving lateral acceleration data from at least one on-board vehicle dynamic ride sensor;
    processing the lateral acceleration data to produce an output signal from the received lateral acceleration data, wherein the output signal decays according to an exponentially weighted moving average filter applied to the lateral acceleration;
    comparing the output signal with at least one output threshold to determine the manner in which the vehicle is driven;
    boosting the output signal if the length of time the lateral acceleration data remains above at least one lateral acceleration data threshold value for a predetermined period of time; and
    sending a control signal to inhibit lowering of the ride height of the vehicle, wherein the control signal is indicative of the manner in which the vehicle is driven.

12. The method of claim 11, wherein the processing step comprises comparing the lateral acceleration data with the at least one lateral acceleration data threshold value.

13. A non-transitory, computer-readable storage medium storing instructions thereon that when executed by one or more processors causes the one or more processors to carry out the method of claim 11.

14. A vehicle comprising a system according to claim 1.

* * * * *